Patented May 26, 1953

2,640,076

UNITED STATES PATENT OFFICE 2,640,076

1-PHENYL-2(METHYL-CAMPHOSULFONYL) AMINO PROPANOLS

Jules Henri Théophile Ledrut, Brussels, Belgium, assignor to Luxema S. A., Ixelles (Brussels), Belgium, a company of the Great Duchy of Luxemburg No Drawing. Application April 25, 1951, Serial No. 222,945. In Belgium February 10, 1948

3 Claims. (Cl. 260—556)

This application is a continuation-in-part of the copending application Serial No. 74,856, filed February 5, 1949, now abandoned.

This invention relates to 1-phenyl-2(methyl-camphosulfonyl) amino-propanols having the following formulas:

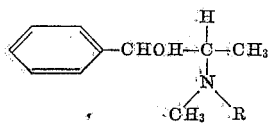

in which R is a camphosulfonyl radial which is connected to the nitrogen atom of the 1-phenyl-2-methylamino-propanol through the sulfur atom of the radical.

The 1-phenyl-2(methyl-camphosulfonyl) amino-propanols are useful as therapeutic compositions and may be used in conditions for which ephedrine or 1-phenyl-2-methylamino-propanol is indicated at approximately the same dosage levels of ephedrine. They are more desirable for administration for certain conditions and may be used for the treatment of other conditions for which ephedrine would not be given because of toxicity or other characteristics of ephedrine not manifested by the 1-phenyl-2(methyl-camphosulfonyl) amino-propanols. When 1-phenyl-2(methyl-$\beta$-camphosulfonly) amino-propanol is administered intravenously or via the buccal channel to a cat or dog, a rise in pressure is manifest which is slower than that obtained by the injection of adrenaline, but is more prolonged. 1-phenyl-2(methyl-$\beta$-camphosulfonyl) amino-propanol also effects a favorable action on respiration and is particularly useful as an antidote for morphine. When administered to a dog depressed with morphine and with sinus carotid excluded, the pressive cartiotonic and analeptic (restorative) respiratory action is most marked. 1-phenyl-2(methyl-$\beta$-camphosulfonyl) amino-propanol is also very efficacious in combating intoxication caused by barbiturates. It rapidly reestablishes cardiac contraction in the animal depressed by the soporific. Again, 1-phenyl-2 (methyl-$\beta$-camphosulfonyl) amino-propanol when added to an isolated rabbit auricle in an appropriate vehicle produces an augmentation of amplitude of the isolated organ. This test indicates that 1-phenyl-2 (methyl-$\beta$-camphosulfonyl) amino-propanol is not toxic for the heart, as contrasted with ephedrine which when administered in repeated doses to an isolated rabbit auricle wears out that organ. Moreover, 1-phenyl-2(methyl-$\beta$-camphosulfonyl) amino-propanol is significantly less toxic than ephedrine. The minimum lethal dose of 1-phenyl-2(methyl-$\beta$-camphosulfonyl) amino-propanol is about 304 milligrams per kilo of body weight of animal compared with about 286 milligrams per kilo of body weight for ephedrine administered as ephedrine hydrochloride.

The 1-phenyl-2 (methyl-camphosulfonyl) amino-propanols may be administered orally or parenterally. These compounds may be administered to man in approximately the same dosages prescribed for use of ephedrine.

The 1-phenyl-2 (methyl-camphosulfonyl) amino-propanols may be produced by reacting ephedrine with a camphosulfonyl chloride or bromide. For example, ephedrine may be reacted with $\beta$-camphosulfonyl chloride or bromide or with $\pi$-camphosulfonyl chloride or bromide having the following formulas:

$\beta$-Camphosulfonyl chloride or bromide

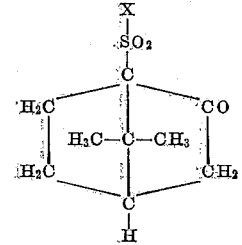

in which X is chlorine or bromine.

$\pi$-Camphosulfonyl chloride or bromide

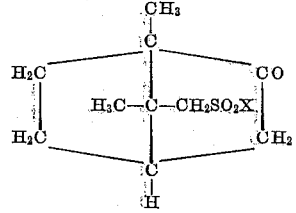

in which X is chlorine or bromine.

Conveniently, the reaction is effected by contacting in the presence of an anhydrous alkali the $\beta$- or $\pi$-camphosulfonyl chloride or bromide with ephedrine dissolved in a solvent in which both ephedrine and the camphosulfonyl chloride or bromide are soluble but in which the 1-phenyl-2 (methyl-amphosulfonyl) amino-propanol is substantially insoluble. Although any proportions of reactants may be employed, it is desirable to use equimolecular proportions.

Preferably, an anhydrous alkali, such as sodium carbonate, is added to and agitated well with a solution of the ephedrine dissolved in an anhydrous solvent in which both the ephedrine and $\beta$- or $\pi$-camphosulfonyl chloride or bromide, are soluble and in which the desired derivative is insoluble. Examples of solvents which may be employed are ethyl ether, petroleum ether and monocyclic aryl hydrocarbons having less than nine carbon atoms, for example, benzene, toluene or xylene. The β- or π-camphosulfonyl chloride or bromide, which is conveniently dissolved in an anhydrous solvent in which ephedrine is also soluble and in which the desired derivative is substantially insoluble, is then added to the solution of the ephedrine containing the anhydrous alkali. A solid precipitate, which is the corresponding 1 - phenyl - 2(methyl-comphosulfonyl) amino-propanol, is formed; and this precipitate may be separated from the reaction mixture by any suitable means, such as by filtration, decantation or centrifugation. If purification is desired, the separated precipitate is dissolved in a solvent for it, such as chloroform or ethanol, and reprecipitated by the addition to the resulting solution of an organic vehicle in which the 1-phenyl-2(methyl-camphosulfonyl)-amino-propanol is insoluble, such as ethyl ether, petroleum ether or a monocyclic aryl hydrocarbon having less than nine carbon atoms. Alternatively, the initially precipitated or reprecipitated product may be purified by crystallization from a suitable solvent, such as a mixture of chloroform and ethanol.

A more comprehensive understanding of this invention is obtained by reference to the following examples:

EXAMPLE 1

*Preparation of 1-phenyl-2 (methyl-β-camphosulfonyl) amino-propanol*

To 165 parts of ephedrine dissolved in 300 parts of anhydrous ethyl ether is added 100 parts of dry sodium carbonate. The mixture is well agitated, and to the agitated mixture is added a saturated solution of β-camphosulfonyl chloride in anhydrous ethyl ether and containing 252 parts of β-camphosulfonyl chloride. The resulting reaction mixture is well agitated. A bulky precipitate is formed which is 1-phenyl-2 (methyl - β - camphosulfonyl) amino-propanol. The precipitate is separated by filtration. The precipitate is purified by dissolving it in chloroform or ethanol, and reprecipitated by the addition of six to eight times its volume of ethyl ether. The 1-phenyl-2 (methyl-β-camphosulfonyl) amino-propanol may also be recrystallized from a mixture of chloroform and ethanol with a yield of 320 parts by weight.

The 1-phenyl-2 (methyl - β - camphosulfonyl) amino-propanol obtained may be represented by the following formula:

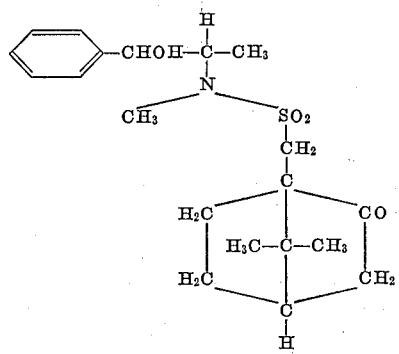

1-phenyl-2 (methyl-β-camphosulfonyl) amino-propanol is soluble in water, methanol, ethanol, choloroform, ethyl acetate and ice cold acetic acid. It is only slightly soluble in warm benzene and is insoluble in ethyl ether and petroleum ether. The melting point of the dinitrophenylhydrozone, produced by reacting the 1-phenyl-2 (methyl - β - camphosulfonyl) amino-propanol with dinitrophenylhydrazine, is 230–231° C.

EXAMPLE 2

*Preparation of 1 - phenyl - 2 (methyl-β-camphosulfonyl) amino-propanol*

A saturated solution of 252 parts of β-camphosulfonyl chloride in anhydrous benzene is poured slowly into an anhydrous benzene solution of ephedrine containing 330 parts of ephedrine to which has been added 200 parts of anhydrous sodium carbonate. The mixture is shaken well. The bulky precipitate which is formed and which is 1-phenyl-2 (methyl-β-camphosulfonyl) amino-propanol is separated by filteration and dissolved in ethanol or chloroform. It is reprecipitated from the resulting solution by the addition thereto of six to eight volumes of ethyl ether. The 1-phenyl-2 (methyl - β - camphosulfonyl) amino-propanol obtained has a melting point of 157–160° C.

EXAMPLE 3

*Preparation of 1 - phenyl - 2 (methyl-π-camphosulfonyl) amino-propanol*

Example 1 is repeated except that a saturated solution containing 252 parts of π-camphosulfonyl chloride in ethyl ether is used instead of the saturated ethyl ether solution of β-camphosulfonyl chloride employed in Example 1.

The 1 - phenyl - 2 (methyl-π-camphosulfonyl) amino-propanol which is obtained may be represented by the following formula:

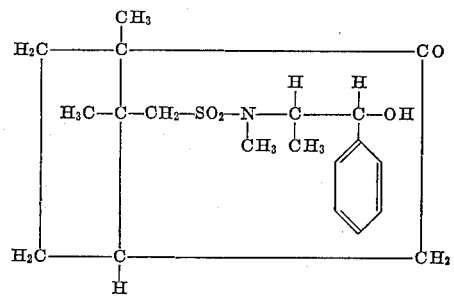

EXAMPLE 4

*Preparation of 1-phenyl-2 (methyl - β - camphosulfonyl) amino-propanol*

Example 1 is repeated except that a saturated solution containing 296 parts of β-camphosulfonyl bromide in ethyl ether is used instead of the saturated ethyl ether solution containing 252 parts of β-camphosulfonyl chloride employed in Example 1.

EXAMPLE 5

*Preparation of 1-phenyl-2(methyl-π-camphosulfonyl) amino-propanol*

Example 1 is repeated except that a saturated solution containing 296 parts of π-camphosulfonyl bromide in ethyl ether is used instead of the saturated ethyl ether solution containing 252 parts of β-camphosulfonyl chloride employed in Example 1.

The N-camphosulfonyl halides used in the examples may be prepared by the methods described in the following references:

β-Camphosulfonyl chloride—Reychler in the Bulletin de la Societe Chimque de France, 3rd Series, 19 (1895), p. 124;

β-Camphosulfonyl bromide—Armstrong and Lowy in Journal of the Chemical Society of London, 81 (1902), p. 1447;

π-Camphosulfonyl chloride — Kipping and Poppe in Journal of the Chemical Society of London, 67 (1895), p. 358; and π-Camphosulfonyl bromide — Kipping and Poppe in Journal of the Chemical Society of London, 67 (1895), p. 364.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

What is claimed is:

1. A 1 - phenyl - 2(methyl - camphosulfonyl) - amino propanol having the following formula:

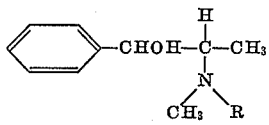

in which R is a camphosulfonyl radical which is connected to the nitrogen atom of the 1-phenyl-2-methylaminopropanol through the sulfur atom of said radical.

2. The compound 1 - phenyl - 2(methyl - β-camphosulfonyl)amino propanol, having the following formula:

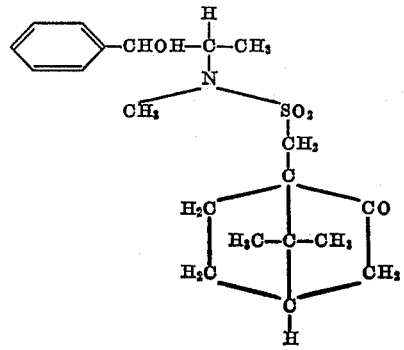

3. The compound 1 - phenyl - 2(methyl - π-camphosulfonyl)amino propanol, having the following formula:

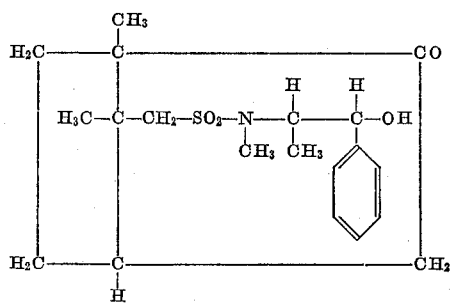

JULES HENRI THÉOPHILE LEDRUT.

References Cited in the file of this patent

UNITED STATES PATENTS

| Number | Name | Date |
|---|---|---|
| 2,373,299 | Dougherty et al. | Apr. 10, 1945 |

FOREIGN PATENTS

| Number | Country | Date |
|---|---|---|
| 480,259 | Belgium | Feb. 10, 1948 |

OTHER REFERENCES

Chemical Abstracts, vol. 31, (1937), page 4051.
Chemical Abstracts, vol. 33, (1939), page 9452.
Foldi, "Ber. deut. Chem.," vol. 64 (1930), pp. 2257 to 2269.